United States Patent
Herrmann et al.

(10) Patent No.: US 9,496,738 B2
(45) Date of Patent: Nov. 15, 2016

(54) METHOD AND APPARATUS FOR CHARGING A BATTERY USING MULTIPLE CHARGING SOURCES

(71) Applicant: MOTOROLA SOLUTIONS, INC., Schaumburg, IL (US)

(72) Inventors: John E. Herrmann, Suwanee, GA (US); Amy T. Herrmann, Suwanee, GA (US); Roy L. Kerfoot, Jr., Lilburn, GA (US); Edmond Louie, Sneilville, GA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 666 days.

(21) Appl. No.: 13/691,275

(22) Filed: Nov. 30, 2012

(65) Prior Publication Data
US 2014/0152234 A1    Jun. 5, 2014

(51) Int. Cl.
*H02J 7/00* (2006.01)
*H02J 1/10* (2006.01)
*H02J 1/12* (2006.01)

(52) U.S. Cl.
CPC .............. *H02J 7/0055* (2013.01); *H02J 7/007* (2013.01)

(58) Field of Classification Search
CPC ........................................................ H02J 1/10
USPC ............................................ 320/101; 307/44
See application file for complete search history.

(56) References Cited

U.S. PATENT DOCUMENTS

| | | |
|---|---|---|
| 6,177,780 B1 | 1/2001 | Roy |
| 6,731,096 B1 | 5/2004 | Patino |
| 7,135,836 B2 | 11/2006 | Kulkut |
| 8,102,149 B2 | 1/2012 | Hwang |
| 8,228,042 B2 | 7/2012 | Kurihara |
| 8,237,412 B2 | 8/2012 | Johnson |
| 8,319,478 B2 * | 11/2012 | Humphrey et al. .......... 320/138 |
| 2004/0189251 A1 | 9/2004 | Kutkut et al. |
| 2007/0150146 A1 * | 6/2007 | Bernardi .................. H02J 1/10 701/50 |

(Continued)

FOREIGN PATENT DOCUMENTS

| | | |
|---|---|---|
| GB | 2401258 A | 11/2004 |
| GB | 2438656 A | 12/2007 |

(Continued)

OTHER PUBLICATIONS

Corresponding International Application No. PCT/US2013/069494—International Search Report with Written Opinion—mailing Date Jul. 16, 2014.

(Continued)

*Primary Examiner* — Edward Tso
*Assistant Examiner* — Ahmed Omar
(74) *Attorney, Agent, or Firm* — Barbara R. Doutre; Scott M. Garrett

(57) ABSTRACT

Embodiments include a modular battery charger having a main charging source and is configured to include at least one additional charging source that can be an auxiliary charging source or an external charging source. The additional charging sources can be added as modules to augment the total charging current that can be provided to a rechargeable battery. The modular battery charger can selectively enable or disable the additional charging sources while controlling the output current of the main charging source to adjust the charging current provided to a rechargeable battery.

18 Claims, 7 Drawing Sheets

(56) References Cited

U.S. PATENT DOCUMENTS

| | | |
|---|---|---|
| 2008/0174277 A1 | 7/2008 | Singh |
| 2009/0058356 A1 | 3/2009 | Lee et al. |
| 2009/0146610 A1 | 6/2009 | Trigiani |
| 2009/0236916 A1* | 9/2009 | Nishimura .................... 307/80 |
| 2010/0090657 A1 | 4/2010 | Fazakas |
| 2014/0042814 A1* | 2/2014 | Kather .................... H02J 1/10 307/59 |

FOREIGN PATENT DOCUMENTS

| | | |
|---|---|---|
| WO | 2006127244 A2 | 5/2006 |
| WO | 2009029534 A1 | 8/2008 |
| WO | 2011108925 A2 | 3/2011 |
| WO | 2011143158 A2 | 11/2011 |
| WO | 2011431158 A2 | 11/2011 |
| WO | 2012024182 A1 | 2/2012 |

OTHER PUBLICATIONS

Intellectual Property Office, Patents Act 1977 Examination Report under Section 18(3), Application No. GB1508502.0, date of report Oct. 30, 2015, all pages.

* cited by examiner

METHOD AND APPARATUS FOR CHARGING A BATTERY USING MULTIPLE CHARGING SOURCES

FIELD OF THE DISCLOSURE

The present disclosure relates generally to battery charging, and more particularly to charging a battery using a charger that has multiple charging sources to provide current to the battery.

BACKGROUND

A typical battery charger has a maximum charge current that it can provide to a battery being charged. If a battery user is unsatisfied with the resulting charge rate (e.g. the time it takes to recharge the battery), there is little the user can do. Of course, the maximum charge current that can be provided by a charger affects the cost of the charger. A higher charge current requires proportionally larger and more expensive components to handle the increased power output. Thus, a user must choose between a more expensive, faster charging charger, or a smaller, less expensive charger that can take longer to charge a battery. Unfortunately conventional chargers are not modifiable, so if the user desires a different form factor or different charging capacity, the user must purchase another charger to meet those needs.

Accordingly, there is a need for a battery charger that can be modified to suit the particular needs of a user at a given time.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
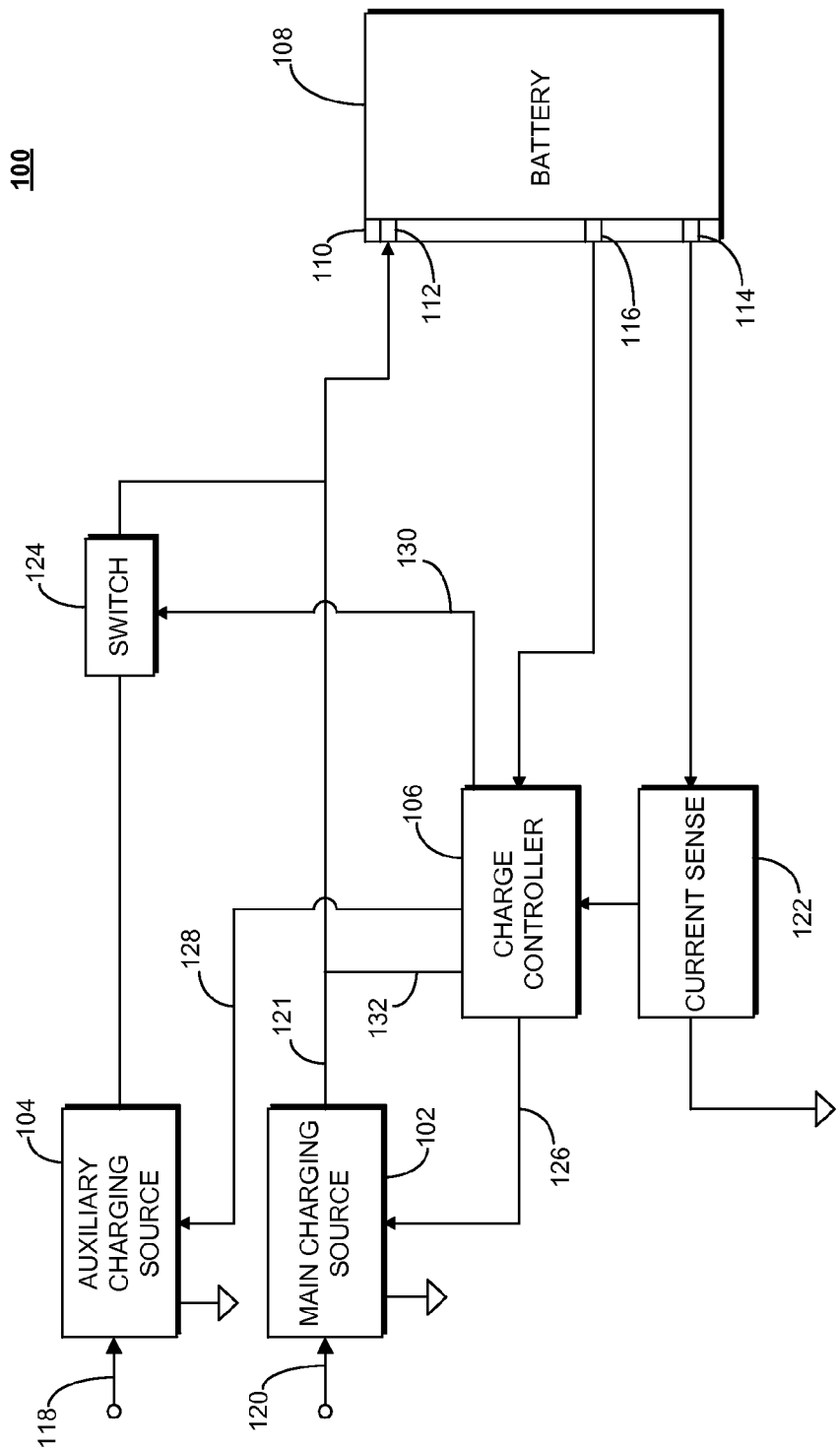
FIG. 1 is a block diagram of a battery charger in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments include a modular battery charger that includes a main charging source. The main charging source is a regulated electric power source that provides a main charging current to a charging interface. The charging interface allows a rechargeable battery to connect to the charger so that the rechargeable battery can be charged by the modular charger. The modular battery charger also includes an auxiliary charging source that selectively provides auxiliary charging current to the rechargeable battery. A charge controller is operably coupled to the main charging source and controls the main charging source to provide a main charging current to the charging interface. The charge controller is further operably coupled to the auxiliary charging source to enable or disable the auxiliary charging source.

FIG. 1 is a block diagram of a battery charger 100 in accordance with some embodiments. The battery charger includes a main charging source 102 that is a regulated variable electric power source. The main charging source 102 is capable of providing a charging current at a selected constant level, based on, for example, a control signal input, where the output voltage is dictated, for example, by the voltage of the battery being charged by the charging current. It can also be operated in a constant voltage mode, where the output current is allowed to vary with the load (e.g. the battery being charged). Thus, the main charging source 102 is a controllable constant-current, constant-voltage (CCCV) source where both the current and voltage can be controlled while charging a battery. The main charging source 102 receives input power 120 from an electrical power source that can be DC or alternating current (AC) service and it contains the necessary power components to filter the input power 120 and convert it to the desired DC output 121. For example, the main charging source 102 can be an AC to DC converter with a DC to DC output stage. Alternatively, the input power 120 can be, in some embodiments, a DC source, such as, for example, a 12 volt DC vehicular power source, and the main charging source 102 only requires DC to DC operation.

The battery charger 100 further includes an auxiliary charging source 104 that provides an auxiliary charge current. The auxiliary charging source 104 is selectively enabled, meaning it can be turned on or turned off, essentially. It provides a set output current and has a voltage limit. The auxiliary charging source 104 receives input power 118 that can be the same as provided to the main charging source 102 (e.g. input power 120), or it can be derived from a different power source. Accordingly, the auxiliary charging source 104 also includes power components and circuitry for electric power conversion to convert the input power 118 to a regulated output. In some embodiments, the auxiliary charging source can provide a higher level of current than the main charging source 102. In some embodiments the auxiliary charger is a module that can be plugged into the charger 100 to provide additional charging capacity.

Both the main charging source 102 and auxiliary charging source 104 are controlled by a charge controller 106. The charge controller 106 is operably coupled to the main charging source 102 by control line 126, and is operably coupled to the auxiliary charging source 104 by control line 128. The charge controller can selectively enable the auxiliary charging source 104 by control line 128. That is, control line 128 acts as an on/off signal. Furthermore, a switch 124 can be controlled by the charge controller 106 over control line 130 to connect or disconnect the auxiliary charging source 104 to the battery 108. When the auxiliary charging source 104 is turned on, it outputs a set current level, subject to a maximum voltage limit, and both the set current level and maximum voltage limit can be inherent in the design of the auxiliary charging source 104. The charge controller controls the main charging source 102 by providing a variable control signal over control line 126 to adjust the output of the main charging source 102. Accordingly, the charge controller can control the amount of total charge current going to the battery 108 by controlling the amount of current output by the main charging source 102 and selectively enabling the auxiliary charging source 104. For example, the desired total charge current is more than that provided by the auxiliary charging source 104, the charge controller 106 will enable the auxiliary charging source 104 and adjust the output of the main charging source 102 to make up the difference between the desired total charge current and the output current provided by the auxiliary charging source 104. When the desired current is less than that provided by the auxiliary charging source 104, the charge controller 106 will shut off the auxiliary charging source 104 and only use the main charging source 102. If the auxiliary charging source 104 is designed to provide the same current output as the maximum output of the main charging source 102, then the total current range that can be achieved is zero to twice the maximum of the main charging source 102.

The main charging source 102 and the auxiliary charging source 104 provide charging current to the battery 108. The battery is connected to the charger 100 by a charging interface 110. The charging interface 110 includes a set of contacts on the charger that mate with a corresponding set of contacts on the battery, as is well known. The contacts in the charger 100 can be cantilevered spring contacts that make physical contact with corresponding pads or other exposed conductors on the battery 108, thus forming an electrical contact. The charging interface 110 includes a positive contact 112, and negative contact 114, and can include an information contact 116. Charging current from the main charging source 102 and auxiliary charging source 104 can be provided to the battery 108 through the positive contact 112, and returned through negative contact 114. The battery 108 includes one or more rechargeable cells, and can further include safety circuitry such as over-voltage and under-voltage protection, high current positive temperature coefficient resettable fuse devices, as are known.

A current sense circuit 122 senses the returned current and provides a current sense signal to the charge controller allowing the charge controller to monitor the current and make adjustments as necessary, such as by changing the signal on control line 126 to the main charging source 102. The current sense circuit 122 may comprise, for example, a small series resistance and an amplifier to amplify the sense signal produced by the current passing through the sense resistance. Though current sense is represented as low-side current sense, skilled artisans will appreciate that high-side current sense may be used instead.

The charge controller 106 can be implemented with a microcontroller or microprocessor executing appropriate instruction code for carrying out the operations typically associated with charging a battery as well as the novel aspects of the embodiments taught herein. The charge controller 106 can be interfaced to an information contact 116 to receive information from the battery 108. The information can include, for example, battery type, battery capacity, battery charge remaining, battery temperature, and so on. Similarly, additional information contacts can be added as necessary for different types of information.

Figure 2:
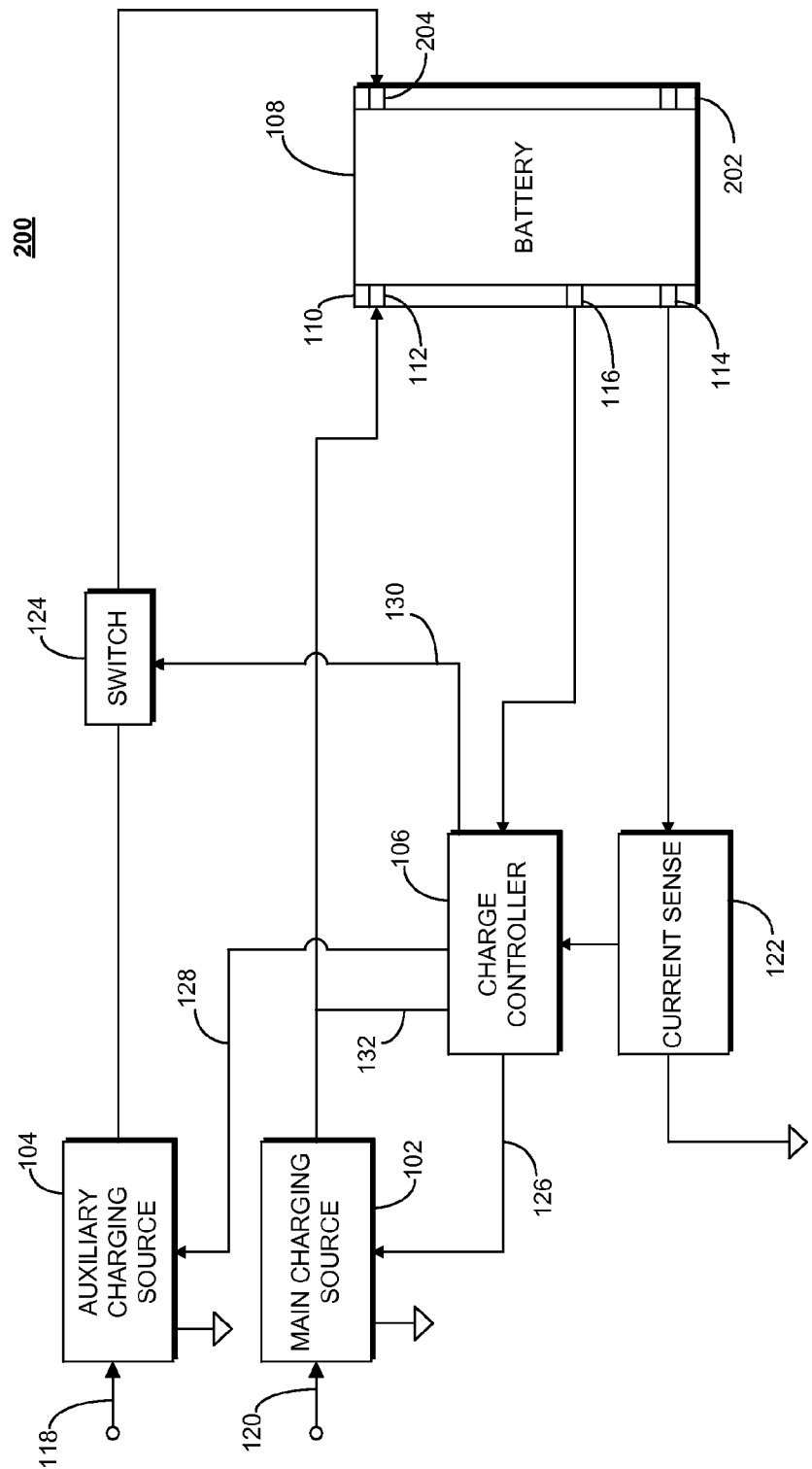
FIG. 2 is a block diagram of a battery charger in accordance with some embodiments.

FIG. 2 is a block diagram of a battery charger 200 in accordance with some embodiments. The battery charger embodiment shown here contains similar components as shown in FIG. 1, as do the chargers shown in FIGS. 3-4. Here the auxiliary charger is arranged to provide its current to a positive device contact 204 of a set of device contacts 202. The device contacts are additional contacts that connect to a device powered by the battery 108. For example the device can be a portable or laptop computer, tablet computer, communication device, two-way radio, and so on. It is common for a battery to have both a set of charging contacts 110 and a set of device contacts 202 to allow charging of the battery while it is attached to a device, and to power the device when the device is not attached to an external power source. In some embodiments the battery can be removed from the device, and the charger 100 can connect directly to device contacts 202. In some embodiments the set of device contacts can be disposed on the device, independent of the battery 108, and the current passes through the device to the battery. Thus, the term "device contacts" refers to contacts on the battery 108 that interface with the device, or contacts on the device though which current and voltage can be provided to both charge the battery 108 and power the device. In the arrangement of the charger in FIG. 2 the return current all passes though the negative charging contact 114. The embodiment of FIG. 2 is advantageous for a battery 108 that includes discharge protection between the positive charging contact 112 and the battery cell(s). For example, it is common to connect a diode between the positive charging contact 112 and the battery cells so as to allow a charging current into the battery cells, but block current from being sourced by the battery cells through the positive charging contact 112. Because of the forward voltage drop across a charging diode, the diode can dissipate significant heat while charging, thus it is desirable to minimize the amount of current through the diode. By providing current through the positive device contact 204 the current through the positive charging contact can be minimized.

Figure 3:
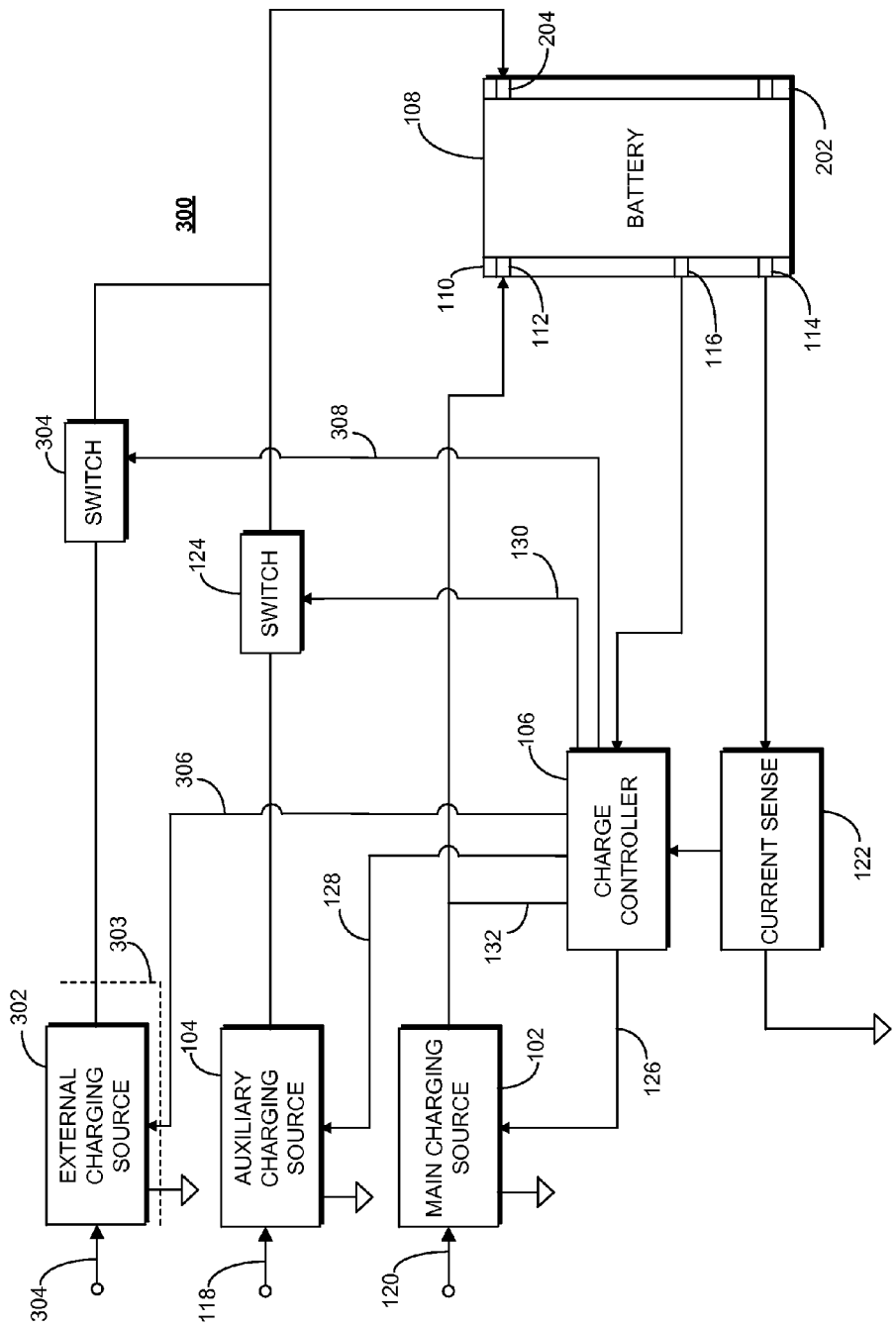
FIG. 3 is a block diagram of a battery charger in accordance with some embodiments.

FIG. 3 is a block diagram of a battery charger 300 in accordance with some embodiments. Here the charger 300 is configured to connect to an external charging source 302. The external charging source 302 is a module that connects to the charger 300 via an external charger source interface 303 that includes electrical contacts that mate with corresponding contacts on the external charging source 302. The external charging source 302 receives power input 304, which can be a shared input with power inputs 118, 120, or it can be from a separate, independent power source. As with the auxiliary charging source 104, the external charging source can provide a set current output, subject to an upper voltage limit, which is the same voltage limit at which the auxiliary charging source 104 is designed to limit. The external charging source is selectively enabled, and operatively coupled to the charge controller 106 by control line 306 via which the charge controller 106 can enable or disable the external charging source 302. The external charging source can alternatively, or additionally, be controlled via switch 304 that the charge controller 106 can control over control line 308. As shown here, the current provided by the external charging source 302 can be combined with that provided by the auxiliary charging source 104, and provided to the battery 108 via the positive device contact 204. However, as will be appreciated by those skilled in the art, the current from the main charging source 102, auxiliary charging source 104, and external charging source 302 can be combined and provided to the battery 108 via the positive charging contact 112, as in FIG. 1. Like the auxiliary charging source 104, the external charging source provides a set charging current that is constant (subject to voltage limits). Accordingly, the charge controller can use the auxiliary charging source 104 and external charging source 302 to set a course level of current, and use the main charging source 102 to adjust the current applied to the battery 108 to fine tune the total current to a desired level.

Figure 4:
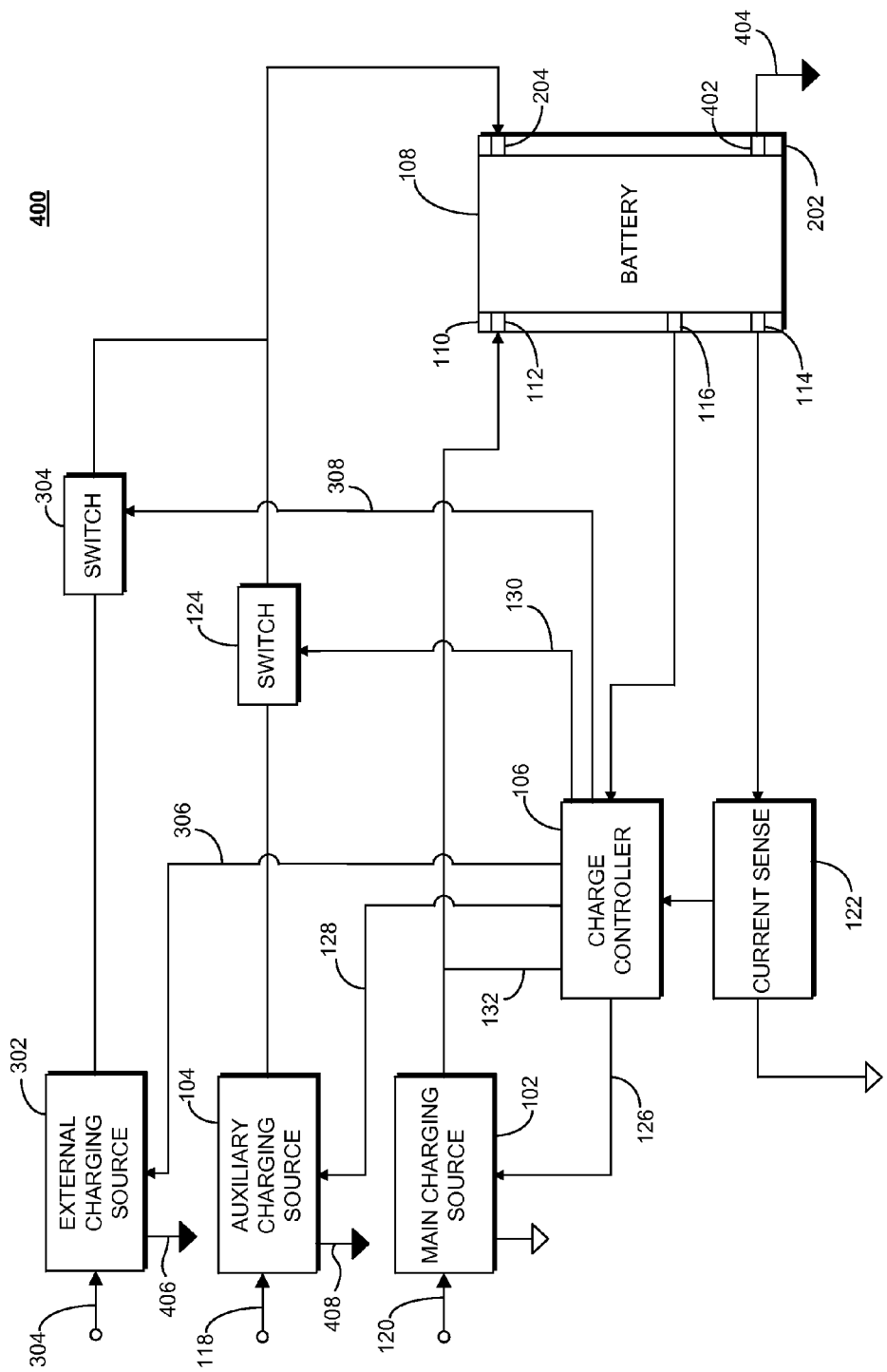
FIG. 4 is a block diagram of a battery charger in accordance with some embodiments.

FIG. 4 is a block diagram of a battery charger 400 in accordance with some embodiments. The battery charger 400 is substantially similar to that shown in FIG. 3, but uses different returns paths for the current provided by the auxiliary charging source 104 and external charging source 302. In particular the auxiliary charging source 104 and external charging source 302 provide their current to the positive device contact 204, but the return is through the negative device contact 402 to a separate device ground 404, to which the auxiliary charging source 104 and external charging source 302 are grounded by grounds 408, 406, respectively. The charge controller 106 knows the set current output of the auxiliary charging source 104 and external charging source 302, so it does not need to sense them through current sense circuit 122, rather, the current output of auxiliary charging source 104 and external charging source 302 can be added to the sensed current, which is from the main charging source 102. The current from the auxiliary charging source 104 and external charging source 302 can be provided to the battery 108 though the positive device contact 204 as shown, or through the positive charging contact 112. By having separate grounds from the main charging source 102, the auxiliary charging source 104 and external charging source 302 can use different power input for inputs 118, 304 than is used for input 120 of the main charging source 102.

Figure 5:
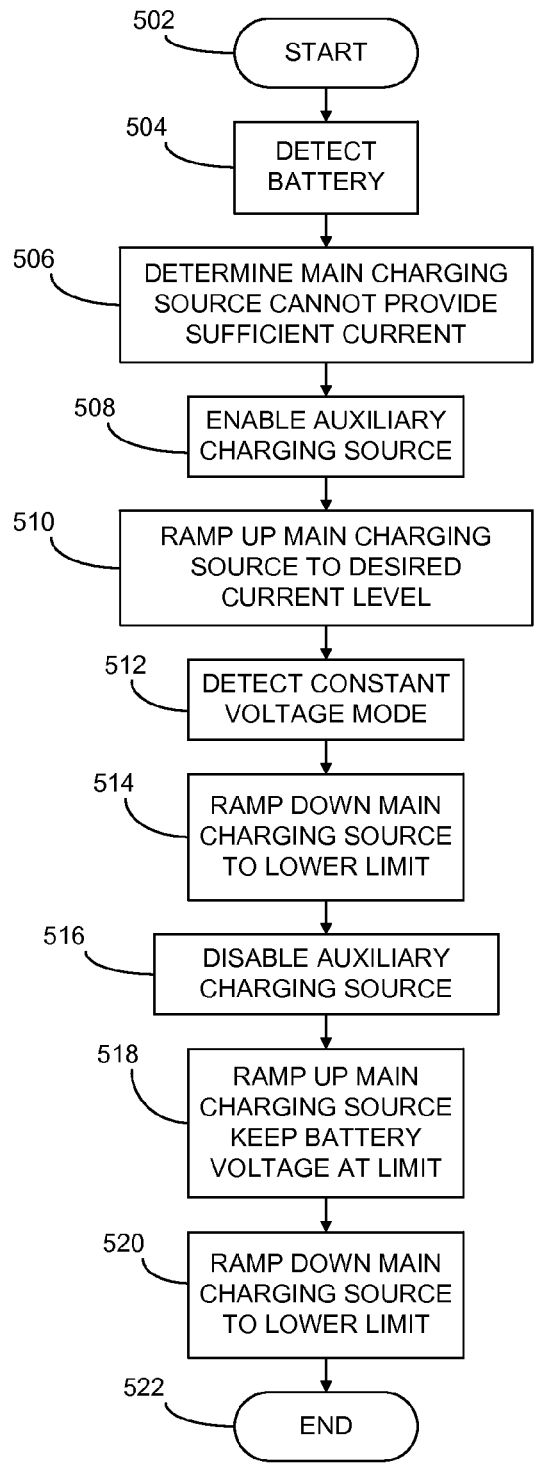
FIG. 5 is a flow chart of a method of operating a battery charger in accordance with some embodiments.

FIG. 5 is a flow chart of a method 500 of operating a battery charger in accordance with some embodiments. The method 500 is shown here as a series of processes, each process being abstracted as a box in the flow chart diagram. Additional processes and sub-process can be used in addition to those shown, as will be appreciated by those skilled in the art. The method 500 uses only the main charging source and the auxiliary charging source, but an external charging source could be used as well, with certain processes repeated, as will be understood.

At the start 502 of the method 500 the charger is connected to a power source or sources and is ready to commence charging a battery. The charger can initially be in a sleep mode so as to reduce idle power consumption. A battery is then connected to the charger, such as by a user placing a battery in a charger pocket that is mechanically configured to accept and hold the battery, and mate contacts of the charger with corresponding contacts of the battery. Upon connecting the battery, the method 500 detects the battery in process 504. The battery can be detected by any of a variety of conventional means, such as detecting the battery voltage, detecting an appropriate signal at an information contact of the battery, and so on. The method then determines that the main charging source cannot provide enough current, by itself, to charge the battery at the desired rate, as in process 506. The charger can make this determination by reading information from the battery, such as the battery capacity. Alternatively, the charger can ramp up (increase over time) current from the main charging source until it reaches some level or a maximum, and make the determination based on battery parameters such as, for example, battery voltage. Since the desired charging current is higher than can be provided by the main charging source, the charger enables the auxiliary charging source, as in process 508. The charger can then ramp up the main charging source until the total charging current is equal to the desired charging current level, as in process 510. In the present example, the battery being charged can be a lithium-ion battery, which is charged using an initial constant-current charge regime, then switching to a constant-voltage regime when the battery voltage reaches a voltage limit. In the constant-voltage regime, current is reduced as the battery charges to maintain the battery voltage at the constant limit. When the battery voltage reaches the voltage limit, as detected in process 512, the charger can then ramp down 514 (decrease over time) the current output by the main charging source until it reaches a lower limit (such as substantially zero current). Once the main charging source current is ramped down to the lower limit, the charger then disables the auxiliary charging source in process 516. The sudden decrease of current will cause the battery voltage to drop, so the charger then ramps up the main charging source current in process 518 until the battery voltage is at the voltage limit, and then begins to allow the current to ramp down in a constant voltage charge mode in process 520. Once the main charging voltage again falls to the preselected lower limit, the charging is considered over and the method ends. The charger can maintain a "trickle" charge level to keep the battery "topped off" and compensate for battery self-discharge.

Figure 6:
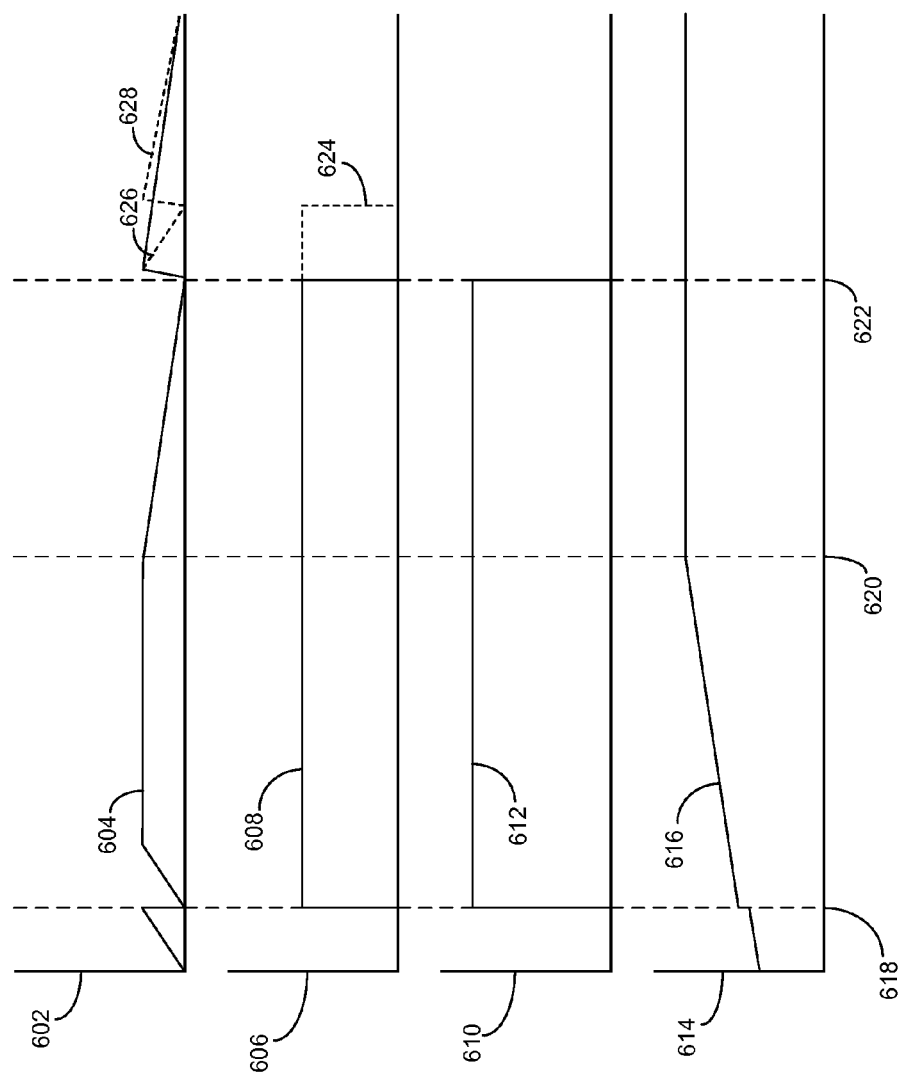
FIG. 6 is a graph chart of various currents and battery voltage over time in operating a battery charger in accordance with some embodiments.

FIG. 6 is a graph chart 600 of various currents and battery voltage over time in operating a battery charger in accordance with some embodiments. The chart 600 shows the currents as they would appear over time while charging a battery, such as according to a method similar to that of FIG. 5. The charts include a first graph 602 of the main charger current 604, as second graph 606 of the auxiliary current 608, a third graph 610 shows the external charging source current 612, and a fourth graph 614 shows battery voltage 616 during charging. The battery being charged uses a CCCV regime, as is used by, for example, a lithium ion battery. The horizontal axis represents time, increasing from left to right, while the vertical axes represent relative magnitude.

The process commences at the origin, where the charger commences ramping up the main charging source current 604 until time 618, when the charger determines that the maximum current of the main charging source is not enough to charge the battery at the desired rate. Accordingly, the charger can then enable the auxiliary charging source current 608, and the external charging source current 612, if needed, and if available. The charger then commences ramping up the main charging source current 604 again until the total charging current is at the desired level. Charging continues at a constant (total) current until the battery voltage 616 reaches a voltage limit at time 620, at which time the charger then begins ramping down, or "folding back" the main charging source current 604 until it reaches a lower limit at time 622. At time 622 the charger can shut off the auxiliary charging source current 608, or the external charging source current 612, or both. If there is no external charging source, the auxiliary charging source current 608 is shut off at time 622, and the main charging source current 604 then ramps up, and then down to the lower limit, as indicated by the solid line portion of the main charging source current 604 after time 622. However, if an external charging source current 612 is used, then the external charging source can be turned off at time 622, while the auxiliary charging source remains on until time 624. While the auxiliary charging source current 608 remains on from time 622 to time 624, the main charging source current 604 ramps up, and then back down as indicated by the dashed line segment 626. Once the auxiliary charging source current 608 is shut off at time 624, the main charging source current 604 again ramps up, until the battery voltage reaches the voltage limit, and then ramps back down as indicated by dashed line segment 628. Thus, the main charging source current is used to reduce the total charge current throughout the constant voltage phase (after time 620) of charging the battery.

Figure 7:
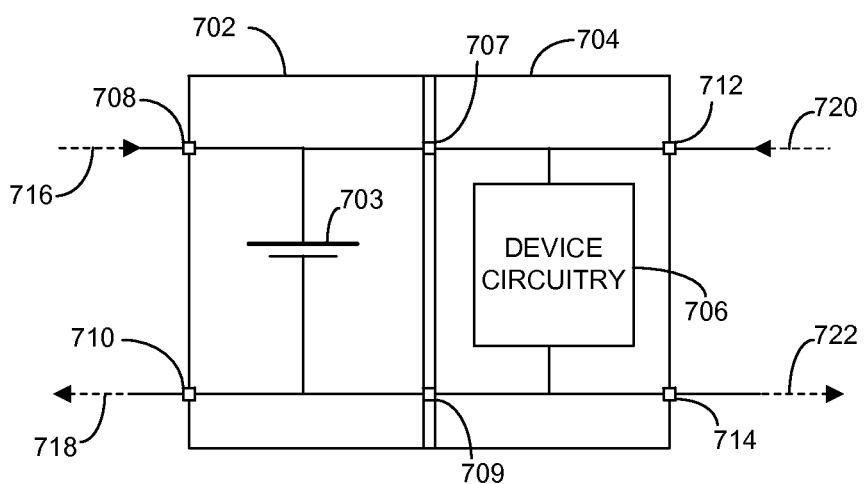
FIG. 7 is a block diagram of a battery and device system in accordance with some embodiments.

FIG. 7 is a block diagram of a battery and device system 700 in accordance with some embodiments. The system 700 includes a rechargeable battery 702 that has one or more rechargeable battery cells 703. The battery 702 is electrically connected to a device 704, such as by a positive contact 707 and a negative contact 709. The device 704 is a portable device that contains device circuitry 706 that can be powered by the battery 702. The battery 702 includes a positive charging contact 708 and a negative charging contact 710 that mate with corresponding contacts on the device 704. The device 704 includes a positive device contact 712 and a negative device contact 714 that are separate from the contacts that mate with charging contacts 708, 710.

The battery 702 and device 704 can be jointly placed into, or otherwise connected to a battery charger, such as any of chargers 200, 300, or 400 of FIGS. 2-4, respectively. In some embodiments all charge current provided by the battery charger can be provided to the positive charging contact 708 as indicated by arrow 716, and all charge current is returned via negative charging contact 710 as indicated by arrow 718. Alternatively, charging current from a main charging source can be provided as indicated by arrow 716 to positive charging contact 708, while additional charging current, such as that provided by an auxiliary charging source and/or an external charging source can be provided to the positive device contact 712 as indicated by arrow 720. The additional current provided to the positive device contact 712 can be returned to the battery charger via the negative charging contact 710, or via negative device contact 714 as indicated by arrow 714.

Accordingly the various embodiments allow for a modular battery charging system where additional charging capacity can be added to the charging system as needed. This provides an initial low-cost charger that can be "upgraded" by adding one or more external or auxiliary charging source modules to increase the output current that can be provided to a battery for charging the battery. Furthermore, by separating the charging sources each charging source can be optimized for efficiency, resulting in an overall gain in efficiency over designs where a single charging source has to provide the same range of charging current that can be achieved with separated charging sources used together.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A modular battery charger, comprising:
a main charging source that provides a main charging current to a charging interface, the charging interface configured to connect to a set of charging contacts of a rechargeable battery;
an auxiliary charging source that selectively provides auxiliary charging current to the rechargeable battery in addition to the main charging current, the auxiliary charging source configured to connect to a positive device contact of a set of device contacts of the rechargeable battery; and
a charge controller operably coupled to the main charging source to control the main charging current provided to the charging interface, and further operably coupled to the auxiliary charging source to enable or disable the auxiliary charging source;
an external charging source interface that accepts an external charging source module that provides additional charging current to the rechargeable battery, the external charging source interface configured to allow the charge controller to selectively enable or disable the external charging source module when connected to the external charging source interface; and
wherein the external charging source interface has a negative contact that is coupled to a negative device contact of the set of device contacts.

2. A modular battery charger, comprising:
a main charging source that provides a main charging current to a charging interface, the charging interface configured to connect to a set of charging contacts of a rechargeable battery;
an auxiliary charging source that selectively provides auxiliary charging current to the rechargeable battery in addition to the main charging current, the auxiliary charging source configured to connect to a positive device contact of a set of device contacts of the rechargeable battery; and
a charge controller operably coupled to the main charging source to control the main charging current provided to the charging interface, and further operably coupled to the auxiliary charging source to enable or disable the auxiliary charging source;
an external charging source interface that accepts an external charging source module that provides additional charging current to the rechargeable battery, the external charging source interface configured to allow the charge controller to selectively enable or disable the external charging source module when connected to the external charging source interface; and
wherein the external charging source interface is further coupled to the positive device contact of a set of device contacts of rechargeable battery to provide additional charging current to the rechargeable battery;
wherein the external charging source interface is coupled to the charging interface through a switch, wherein the switch is operated by the charge controller.

3. A modular battery charger, comprising:
a main charging source that provides a main charging current to a charging interface, the charging interface configured to connect to a set of charging contacts of a rechargeable battery;
an auxiliary charging source that selectively provides auxiliary charging current to the rechargeable battery in addition to the main charging current, the auxiliary charging source configured to connect to a positive device contact of a set of device contacts of the rechargeable battery; and
a charge controller operably coupled to the main charging source to control the main charging current provided to the charging interface, and further operably coupled to the auxiliary charging source to enable or disable the auxiliary charging source;
an external charging source interface that accepts an external charging source module that provides additional charging current to the rechargeable battery, the external charging source interface configured to allow the charge controller to selectively enable or disable the external charging source module when connected to the external charging source interface; and
wherein the external charging source interface has a negative contact that is coupled to a negative device contact of a separate device ground; and
wherein current provided by both the main charging source and the auxiliary charging source passes through sense resistance that is monitored by the charge controller.

4. A modular battery charger, comprising:
a main charging source that provides a main charging current to a charging interface, the charging interface configured to connect to a set of charging contacts of a rechargeable battery;
an auxiliary charging source that selectively provides auxiliary charging current to the rechargeable battery in addition to the main charging current, the auxiliary charging source configured to connect to a positive device contact of a set of device contacts of the rechargeable battery; and
a charge controller operably coupled to the main charging source to control the main charging current provided to the charging interface, and further operably coupled to the auxiliary charging source to enable or disable the auxiliary charging source;
an external charging source interface that accepts an external charging source module that provides additional charging current to the rechargeable battery, the external charging source interface configured to allow the charge controller to selectively enable or disable the external charging source module when connected to the external charging source interface; and
wherein the auxiliary charging source and the external charging source interface have a common ground, the main charging source uses a main ground, and wherein the common ground and main ground are different.

5. A method of operating a battery charger having a main charging source and an auxiliary charging source, comprising:

detecting a battery being electrically connected to the battery charger;

supplying a main charge current from the main charging source to the rechargeable battery;

determining that the battery can be charged with a charging current greater than can be supplied by the main charging source alone;

in response to determining that the battery can be charged with a charging current greater than can be supplied by the main charging source alone, enabling the auxiliary charging source to source an auxiliary current to the rechargeable battery through a positive device contact of a set of device contacts of the rechargeable battery;

in response to enabling the auxiliary charging source, increasing the main charge current provided by the main charging source to a charging interface connected through a set of charging contacts of the rechargeable battery until either a maximum total current of the main charging source and the auxiliary charging source, a maximum battery voltage, or a maximum current of the main charging source is reached;

connecting an external charging source to the battery charger; and enabling the external charging source to provide current to the rechargeable battery.

6. The method of claim 5, wherein determining that the battery can be charged with a charging current greater than can be supplied by the main charging source comprises reading information from the rechargeable battery that indicates that the battery can be charged with a charging current greater than can be supplied by the main charging source.

7. The method of claim 5, wherein determining that the battery can be charged with a charging current greater than can be supplied by the main charging source comprises applying current from the main charging source and increasing the current from the main charging source to the maximum current of the main charging source and determining that additional current can be provided without exceeding a maximum charge current of the rechargeable battery.

8. A method of operating a battery charger having a main charging source and an auxiliary charging source, comprising:

detecting a battery being electrically connected to the battery charger;

supplying a main charge current from the main charging source to the rechargeable battery;

determining that the battery can be charged with a charging current greater than can be supplied by the main charging source alone;

in response to determining that the battery can be charged with a charging current greater than can be supplied by the main charging source alone, enabling the auxiliary charging source to source an auxiliary current to the rechargeable battery through a positive device contact of a set of device contacts of the rechargeable battery;

in response to enabling the auxiliary charging source, increasing the main charge current provided by the main charging source to a charging interface connected through a set of charging contacts of the rechargeable battery until either a maximum total current of the main charging source and the auxiliary charging source, a maximum battery voltage, or a maximum current of the main charging source is reached;

determining that a voltage of the rechargeable battery has reached an upper limit;

maintaining the battery voltage at the upper limit by ramping down current provided by the main charging source until the current provided by the main charging source ramps down to a lower limit; and in response to the current provided by the main charging source ramping down to the lower limit, shutting off the auxiliary charging source, then ramping up the current provided by the main charging source until the battery voltage is at the upper limit, then ramping the current provided by the main charging source down to maintain the battery voltage at the upper limit.

9. A battery charger, comprising:

a main charging source coupled to a charging interface to a set of charging contacts of a rechargeable battery to provide a main charging current to the rechargeable battery;

an auxiliary charging source that selectively provides an auxiliary charge current to the rechargeable battery in addition to the main charging current, the auxiliary charging source configured to connect to a positive device contact of a set of device contacts of the rechargeable battery; and a charge controller operably coupled to the main charging source that controls the charging current, the charge controller further coupled to the auxiliary charging source to enable or disable the auxiliary charging source, wherein the charge controller detects connection to a rechargeable battery and enables the auxiliary charging source to provide the auxiliary charge current to the rechargeable battery if rechargeable battery can be recharged with a current that is greater than a maximum current that can be supplied by the main charging source;

an external charging source connected to an external charging source interface of the battery charger that selectively provides an external source current to the rechargeable battery; and wherein the charge controller further determines that the rechargeable battery can be charged at a rate that is greater than the sum of the auxiliary charge current and the maximum current that can be provided by the main charging source.

10. The battery charger of claim 9, wherein the auxiliary charge current is provided to the rechargeable battery through a switch that is controlled by the charge controller, where the charger controller can open or close the switch.

11. A method of operating a battery charger having a main charging source and an auxiliary charging source, comprising:

detecting a rechargeable battery being electrically connected to the battery charger;

supplying a main charge current from the main charging source to the rechargeable battery;

determining that the rechargeable battery can be charged with a charging current greater than can be supplied by the main charging source alone;

in response to determining that the rechargeable battery can be charged with a charging current greater than can be supplied by the main charging source alone, enabling the auxiliary charging source to source an auxiliary current to the rechargeable battery in addition to the main charge current;

in response to enabling the auxiliary charging source, increasing the main charge current provided by the main charging source until either a maximum total current of the main charging source and the auxiliary charging source, a maximum battery voltage, or a maximum current of the main charging source is reached;

determining that a voltage of the rechargeable battery has reached an upper limit;

maintaining the battery voltage at the upper limit by ramping down current provided by the main charging source until the current provided by the main charging source ramps down to a lower limit; and in response to the current provided by the main charging source ramping down to the lower limit, shutting off the auxiliary charging source, then ramping up the current provided by the main charging source until the battery voltage is at the upper limit, then ramping the current provided by the main charging source down to maintain the battery voltage at the upper limit.

12. The modular battery charger of claim 1, wherein the battery to be charged is a lithium-ion battery.

13. The method of claim 5, wherein the battery to be charged is a lithium-ion battery.

14. The battery charger of claim 9, wherein the battery to be charged is a lithium-ion battery.

15. The method of claim 11, wherein the battery to be charged is a lithium-ion battery.

16. The method of claim 11, wherein enabling the auxiliary charging source to source an auxiliary current to the rechargeable battery in addition to the main charge current comprises:

turning on the auxiliary current, by the charge controller, to provide a set output current and voltage limit.

17. A battery charger, comprising:
a charge controller;
a main charging source;
an auxiliary charging source; and
a rechargeable battery being operably coupled to the main charging source and the auxiliary charging source via the controller, the charge controller configured to:

supply a main charge current from the main charging source to the rechargeable battery;

determine that the rechargeable battery can be charged with a charging current greater than can be supplied by the main charging source alone;

in response thereto, enable the auxiliary charging source to source an auxiliary current to the rechargeable battery in addition to the main charge current;

in response thereto, increase the main charge current provided by the main charging source until either a maximum total current of the main charging source and the auxiliary charging source, a maximum battery voltage, or a maximum current of the main charging source is reached;

determine that a voltage of the rechargeable battery has reached an upper limit;

maintain the battery voltage at the upper limit by ramping down current provided by the main charging source until the current provided by the main charging source ramps down to a lower limit; and in response thereto, shut off the auxiliary charging source, then ramp up the current provided by the main charging source until the battery voltage is at the upper limit, then ramp the current provided by the main charging source down to maintain the battery voltage at the upper limit.

18. The battery charger of claim 17, wherein the auxiliary charging source enables a set output current as the auxiliary current to the rechargeable battery in addition to the main charge current.

* * * * *